(12) United States Patent
Kim

(10) Patent No.: US 9,310,583 B2
(45) Date of Patent: Apr. 12, 2016

(54) CAMERA MODULE

(71) Applicant: LG INNOTEK CO., LTD., Seoul (KR)

(72) Inventor: Hack Ho Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/360,568

(22) PCT Filed: Dec. 6, 2012

(86) PCT No.: PCT/KR2012/010509
§ 371 (c)(1),
(2) Date: May 23, 2014

(87) PCT Pub. No.: WO2013/085291
PCT Pub. Date: Jun. 13, 2013

(65) Prior Publication Data
US 2014/0340575 A1 Nov. 20, 2014

(30) Foreign Application Priority Data

Dec. 9, 2011 (KR) .................. 10-2011-0131670

(51) Int. Cl.
*H04N 5/225* (2006.01)
*G02B 7/02* (2006.01)
*G02B 13/00* (2006.01)
*G02B 26/08* (2006.01)

(52) U.S. Cl.
CPC .............. *G02B 7/026* (2013.01); *G02B 13/009* (2013.01); *G02B 26/0875* (2013.01); *H04N 5/2253* (2013.01); *H04N 5/2254* (2013.01); *H04N 5/2257* (2013.01)

(58) Field of Classification Search
CPC .............. H04N 5/2251–5/2254; H04N 5/2257
See application file for complete search history.

(56) References Cited

U.S. PATENT DOCUMENTS

| 7,813,634 | B2 * | 10/2010 | Gutierrez et al. | 396/133 |
| 8,059,346 | B2 * | 11/2011 | Henderson | 359/824 |
| 2002/0172136 | A1 * | 11/2002 | Tezuka et al. | 369/221 |
| 2010/0141097 | A1 * | 6/2010 | Li et al. | 310/357 |
| 2012/0120508 | A1 * | 5/2012 | Gutierrez | 359/823 |

FOREIGN PATENT DOCUMENTS

| KR | 10-2008-0085444 A | 9/2008 |
| KR | 10-2009-0132209 A | 12/2009 |
| KR | 10-2011-0025420 A | 3/2011 |
| KR | 10-2011-0073043 A | 6/2011 |

OTHER PUBLICATIONS

International Search Report in International Application No. PCT/KR2012/010509, filed Dec. 6, 2012.

* cited by examiner

*Primary Examiner* — Timothy J Henn
(74) *Attorney, Agent, or Firm* — Saliwanchik, Lloyd & Eisenschenk

(57) ABSTRACT

An exemplary embodiment of the present invention includes a support unit, at least two or more connection units extended from the support unit, a lens coupling unit connected to each of the connection units, formed at an inner surface with a window and coupled to at least one or more sheets of lenses, and a piezoelectric driving unit formed at each of the connection units for ascending or descending the connection units and the lens coupling unit.

19 Claims, 3 Drawing Sheets

CAMERA MODULE

CROSS-REFERENCE TO RELATED APPLICATIONS

This application is the U.S. national stage application of International Patent Application No. PCT/KR2012/010509, filed Dec. 6, 2012, which claims priority to Korean Application No. 10-2011-0131670, filed Dec. 9, 2011, the disclosures of each of which are incorporated herein by reference in their entirety.

TECHNICAL FIELD

The teachings in accordance with exemplary and non-limiting embodiments of this invention relate generally to a camera module.

BACKGROUND ART

Generally, a camera module photographs an optical image of an object by receiving the optical image of the object incident through a lens. Recently, a mobile phone is indispensably mounted with a camera module. A user grips a mobile phone using a hand to photograph an object. At this time, an optical image of the object is shaken by handshake of the user, whereby researches on an actuator are being widely required to compensate the shake of the optical image.

Furthermore, in view of the fact that size of a mobile phone must be reduced due to trends to miniaturize the mobile phones, developments of an actuator capable of minimizing an influence on the size of the camera module are urgently needed.

DISCLOSURE OF INVENTION

Technical Problem

Accordingly, the present invention has been made keeping in mind the above disadvantages/problems occurring in the prior art, and an object of the present invention is to provide a camera module configured to reduce power consumption and size of an actuator capable of compensating shakes of light incident on a lens.

Solution to Problem

In order to accomplish the above object, in one general aspect of the present invention, there is provided a camera module, the camera module comprising: a support unit; at least two or more connection units extended from the support unit; a lens coupling unit connected to each of the connection units, formed at an inner surface with a window and coupled to at least one or more sheets of lenses; and driving units formed at each of the connection units for ascending or descending the connection units and the lens coupling unit.

In some exemplary embodiments, the support unit may take a shape of a ring formed at an inner surface with an opening, and the connection units and the lens coupling unit may be positioned at the opening of the support unit.

In some exemplary embodiments, the connection units may be interposed between the support unit and the lens coupling unit.

In some exemplary embodiments, the lens may be bonded to the lens coupling unit using a bump.

In some exemplary embodiments, the driving unit may be a piezoelectric capacitor formed by stacking a bottom electrode, a piezoelectric membrane and an upper electrode to the connection unit.

In some exemplary embodiments, the support unit, the connection units, the lens coupling unit and the piezoelectric driving units may be manufactured in a MEMS (Micro Electric Mechanical System).

In some exemplary embodiments, the ring shape may include a polygonal ring shape or a round ring shape.

In some exemplary embodiments, each of the connection units may be symmetrically positioned based on the lens coupling unit.

In some exemplary embodiments, the lens coupling unit may take a shape of a round ring.

In another general aspect of the present invention, there is provided a camera module comprising a lens barrel including at least one or more lenses; a PCB (Printed Circuit Board) positioned at a bottom surface of the lens barrel and mounted with an image sensor converting an optical image to an electrical signal; at least two or more connection units positioned at an upper surface of the lens barrel and extended from a support unit, a lens coupling unit connected to each of the connection units, formed at an inner surface with a window and coupled to at least one or more lenses, and a driving unit formed at each of the connection units to ascend or descend the connection units and the lens coupling unit.

In some exemplary embodiments, the camera module may further comprise a holder supporting the lens barrel and the actuator, and adhered to the PCB.

In some exemplary embodiments, the driving unit may be one of a driving unit capable of moving the lens to an extreme upper surface, a driving unit capable of moving the lens to an extreme bottom surface and a driving unit capable of moving an intermediate lens.

In some exemplary embodiments, the camera module may further comprise an actuator capable of moving the lens barrel.

In some exemplary embodiments, the actuator may include a handshake compensation function.

In some exemplary embodiments, the support unit may take a shape of a ring formed at an inner surface with an opening, and the connection unit and the lens coupling unit may be positioned at the opening of the support unit.

In some exemplary embodiments, the connection unit may be interposed between the support unit and the lens coupling unit.

In some exemplary embodiments, the lens may be bonded to the lens coupling unit using a bump.

In some exemplary embodiments, each of the connection units may be symmetrically positioned based on the lens coupling unit.

In some exemplary embodiments, the lens coupling unit may take a shape of a round ring.

In some exemplary embodiments, each of the connection units may be symmetrically positioned based on the lens coupling unit.

Advantageous Effects of Invention

A camera module according to the present invention has an advantageous effect in that trembling of light incident on a lens can be compensated.

Another advantageous effect is that a lens driving actuator can be manufactured in MEMS to enable miniaturization of an actuator, integration of parts and reduced power consumption.

BEST MODE FOR CARRYING OUT THE INVENTION

Figure 1:
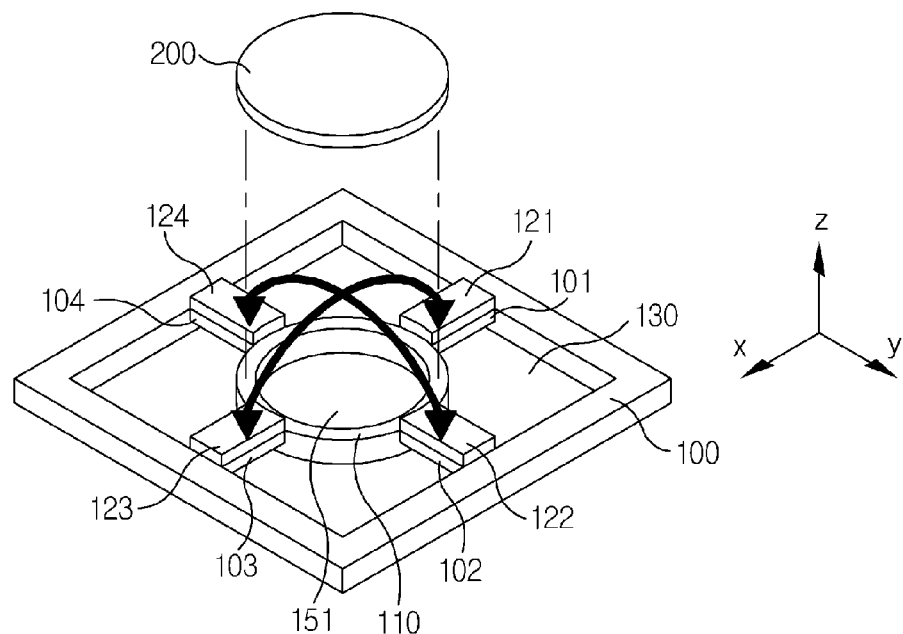
FIG. 1 is a perspective view mimetically illustrating a lens driving actuator according to an exemplary embodiment of the present invention.

Now, the camera module according to exemplary embodiments of the present invention will be described in detail with reference to the accompanying drawings.

In the drawings describing the present invention, the size and relative sizes of layers, regions and/or other elements may be exaggerated or reduced for clarity and convenience. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

FIG. 1 is a perspective view mimetically illustrating a lens driving actuator according to an exemplary embodiment of the present invention.

The lens driving actuator according to an exemplary embodiment of the present invention includes a support unit (100), at least two or more connection units (101, 102, 103, 104) extended from the support unit (100), a lens coupling unit (110) connected to each of the connection units (101, 102, 103, 104), formed at an inner surface with a window (151) and coupled to at least one or more sheets of lenses (200), and driving units (121, 122, 123, 124) formed at each of the connection units (101, 102, 103, 104) for ascending or descending the connection units and the lens coupling unit (110).

Thus, the lens driving actuator is configured such that the connection units (101, 102, 103, 104) are ascended or descended by driving of the driving units (121, 122, 123, 124), and the lens coupling unit (110) is also ascended or descended in response to ascent or descent of the connection units (101, 102, 103, 104).

At this time, as the lens coupling unit (110) is coupled to the lens (200), the lens (200) is also ascended or descended. That is, the lens driving actuator according to an exemplary embodiment of the present invention drives the driving units (121, 122, 123, 124) formed at the connection units (101, 102, 103, 104) to move the connection units (101, 102, 103, 104), the driving units (121, 122, 123, 124) and the lens (200), whereby shake or trembling of light incident on the lens can be compensated.

That is to say, the lens driving actuator according to an exemplary embodiment of the present invention may be an actuator for OIS (Optical Image Stabilization), but may be driven by an auto focusing actuator. At this time, the lens (200) may be designed to compensate the trembling of light by bi-directionally moving to an X-axis titling and a Y-axis tilting. That is, the lens (200) may be tilted to a direction of an arrow in FIG. 1.

Furthermore, the lens (200) and the window (151) may be optically aligned to allow the light having passed the lens to pass the window (151) of the lens coupling unit (110). The support unit (100) serves to support the connection units (101, 102, 103, 104), the driving units (121, 122, 123, 124) and the lens (200). That is, the connection units (101, 102, 103, 104), the driving units (121, 122, 123, 124) and the lens (200) may be supported by the support unit (100), and ascended or descended by the driving of the driving units (121, 122, 123, 124).

The support unit (100) may take a shape of a ring formed at an inner surface with an opening (130), and the ring shape may take any designable shapes including a square ring and a round ring. To be more specific, the support unit (100) may take a shape of a polygonal ring or a round ring. At this time, the connection units (101, 102, 103, 104) and the lens coupling unit (110) may be positioned at the opening (130) of the support unit (100).

Furthermore, the connection units (101, 102, 103, 104) may be interposed between the support unit (100) and the lens coupling unit (110), and each of the connection units (101, 102, 103, 104) may be symmetrically positioned based on the lens coupling unit (110).

That is, the connection units (101, 102, 103, 104) may include symmetrically-formed two connection units, symmetrically-formed four connection units, symmetrically-formed six connection units and symmetrically-formed eight connection units, but the number thereof is not limited thereto. In a non-limiting example, the connection units 101 and 103 are symmetrically formed, and the connection units 102 and 104 are symmetrically formed, as shown in FIG. 1.

In addition, the lens coupling unit (110) may be realized in a round ring shape provided at an inner surface with a window (151) to facilitate the coupling of lenses, where the lenses (200) may be bonded to the lens coupling unit (110) using a bump (150). The driving units (121, 122, 123, 124) may be a piezoelectric driving unit capable of ascending or descending the connection units (101, 102, 103, 104) by piezoelectric force. The piezoelectric driving unit may be a piezoelectric capacitor formed by stacking a bottom electrode, a piezoelectric membrane and an upper electrode on the connection units (101, 102, 103, 104). That is, the driving units (121, 122, 123, 124) may be piezoelectric driving units.

Furthermore, the lens driving actuator formed by the support unit (100), the connection units (101, 102, 103, 104), the lens coupling unit (110) and the driving units (121, 122, 123, 124) may be manufactured by way of MEMS (Micro Electric Mechanical System).

Thus, the present invention has an advantage of miniaturizing an actuator, integrating parts and reducing power consumption, because the present invention can manufacture the lens driving actuator by way of MEMS.

Figure 2A:
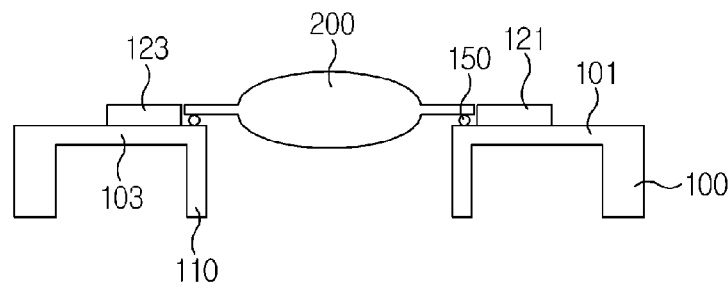
FIGS. 2a, 2b and 2c are cross-sectional views mimetically illustrating operation of a lens driving actuator according to an exemplary embodiment of the present invention.
Figure 2B:
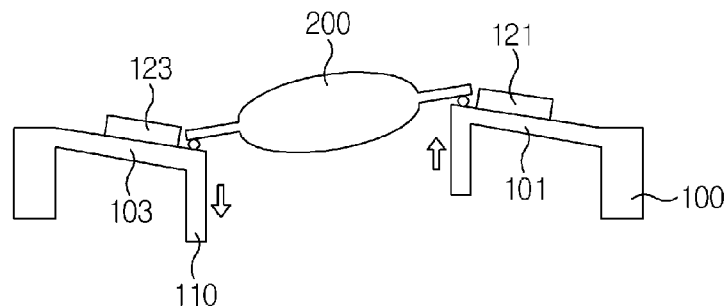
Figure 2C:
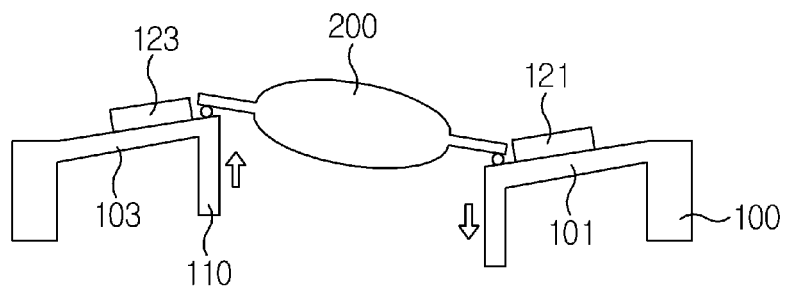

FIGS. 2a, 2b and 2c are cross-sectional views mimetically illustrating operation of a lens driving actuator according to an exemplary embodiment of the present invention.

Referring to FIG. 2a, the lens driving actuator according to an exemplary embodiment of the present invention is configured such that the support unit (100) is connected by the connection units (101, 103), the connection units (101, 103) are connected by the lens coupling unit (110), and the lens (200) is bonded to the lens coupling unit (110) using the bump (150). The driving units (121, 123) are formed at an upper surface of the connection units (101, 103). Thus, in a case the driving units (101, 103) are driven, the connection units (101, 103), the lens coupling unit (110), and the lens (200) are moved together.

That is, in a case a driving unit '123' positioned at left of FIG. 2b is applied with a first voltage, and a driving unit '121' positioned at right of FIG. 2b is applied with a second voltage having an opposite polarity from that of the first voltage, the connection unit '103' and left side of the lens coupling unit (110) descend, while the connection unit '101' and right side of the lens coupling unit (110) ascend, whereby left side of the lens (200) descends while right side of the lens (200) ascends.

Alternatively, in a case a driving unit '123' positioned at left of FIG. 2c is applied with a second voltage, and a driving unit '121' positioned at right of FIG. 2c is applied with a first voltage having an opposite polarity from that of the second voltage, the connection unit '103' and left side of the lens coupling unit (110) ascend, while the connection unit '101' and right side of the lens coupling unit (110) descend, whereby left side of the lens (200) ascends while right side of the lens (200) descends, where the first voltage may be + voltage, and the second voltage may be voltage, and the opposite may apply.

At this time, in a case the driving units (121, 123) are piezoelectric capacitor as described in the foregoing, and in a case an upper electrode and a bottom electrode of the piezoelectric capacitor are respectively applied with the first voltage and the second voltage, a piezoelectric membrane interposed between the upper electrode and the bottom electrode is deformed to ascend or descend the connection units (101, 103).

For reference, FIGS. 2a, 2b and 2c are cross-sectional views are mimetic drawings to illustrate an operation of a lens driving actuator, where the deformation of the connection units, the lens coupling unit and the lens are mimetically and hyperbolically illustrated.

Figure 3:
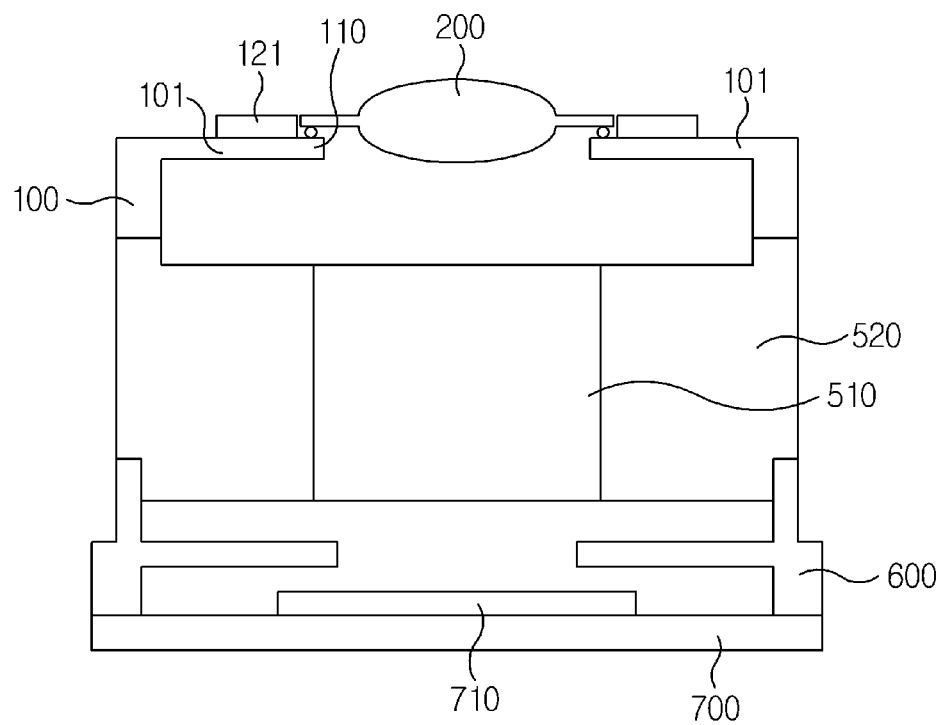
FIG. 3 is a cross-sectional view mimetically illustrating a camera module inclusive of a lens driving actuator according to an exemplary embodiment of the present invention.

FIG. 3 is a cross-sectional view mimetically illustrating a camera module inclusive of a lens driving actuator according to an exemplary embodiment of the present invention.

The camera module according to an exemplary embodiment of the present invention includes a lens driving actuator that includes a lens barrel (510) including at least one or more lenses; a PCB (700, Printed Circuit Board) positioned at a bottom surface of the lens barrel (510) and mounted with an image sensor (710) converting an optical image to an electrical signal; at least two or more connection units (101) positioned at an upper surface of the lens barrel (510) and extended from a support unit (100), a lens coupling unit (110) connected to each of the connection units (101), formed at an inner surface with a window (not shown) and coupled to at least one or more lenses (200), and a driving unit formed at each of the connection units (101) to ascend or descend the connection units (101) and the lens coupling unit (110).

The camera module may further include an actuator (520) moving the lens barrel (510), where the actuator (520) may include a trembling compensation function. The lens coupling unit (110) is not limited to a shape illustrated in FIG. 3, and other shapes are also acceptable. Furthermore, the lens barrel (510) and the actuator (520) may be supported, and a holder (600) coupled to the PCB (700) may be included.

Thus, the camera module according to an exemplary embodiment of the present invention is such that the actuator 520 moves the lens barrel (510) to perform an auto focusing, and the lens driving actuator bi-directionally moves the lens to two axes of an X-axis tilting and a Y-axis tilting to compensate the optical trembling.

Figure 4:
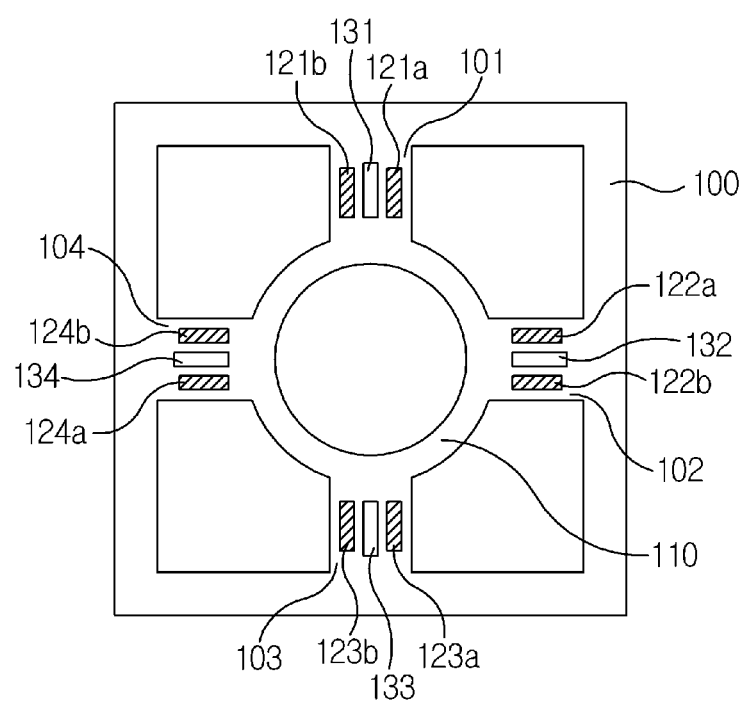
FIG. 4 is a plane view illustrating a lens driving actuator according to another exemplary embodiment of the present invention.

FIG. 4 is a plane view illustrating a lens driving actuator according to another exemplary embodiment of the present invention.

In the lens driving actuator according to another exemplary embodiment of the present invention, each of the connection units (101, 102, 103, 104) may be formed with through holes (131, 1342, 133, 134). Furthermore, the through hole (131) may be formed at each central region of the connection units (101, 102, 103, 104), and each of the connection units (101, 102, 103, 104) may be divided into two regions by the through holes (131, 1342, 133, 134) as shown in FIG. 4. At this time, each of the connection units (101, 102, 103, 104) divided by the through holes (131, 1342, 133, 134) may be formed with driving units (121a, 121b, 122a, 122b, 123a, 123b, 124a, 124b). The driving method thereof is same as that explained in FIGS. 2a, 2b and 2c, such that no more explanation is provided.

The lens actuator in the previous exemplary embodiment of the present invention is formed at an extreme upper surface of the lens, but the lens actuator may be formed at an extreme bottom surface of the lens or may be formed in the middle of the lenses. That is, the lens actuator may be formed with one of a lens actuator capable of moving a lens at the extreme upper surface, a lens actuator capable of moving a lens at the extreme bottom surface and a lens actuator capable of moving a middle lens.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to exemplary embodiments of the present invention has an industrial applicability in that a lens driving actuator can be manufactured by way of MEMS to thereby enable miniaturization of actuator, integration of parts and reduced power consumption.

The invention claimed is:

1. A camera module comprising: a support frame having a plurality of sides; a plurality of connectors wherein each connector of the plurality of connectors is extended from a mid-portion of a respective side of the plurality of sides of the support frame; a lens coupler connected to one end of each connector at a periphery of the lens coupler, formed with a window at an inner surface of the lens coupler for allowing light to pass, and coupled to at least one sheet of lenses; and
   a plurality of lens drivers wherein each lens driver is formed at a respective connector for ascending or descending the connectors and the lens coupler,
   wherein each lens driver is coupled at an upper side of the respective connector, facing the connector, and
   wherein each connector is interposed between the support frame and the lens coupler, symmetrically positioned with respect to the lens coupler.

2. The camera module of claim 1, wherein the support frame takes a shape of a ring with an opening formed at an inner surface of the support frame, and wherein each connector and the lens coupler are positioned at the opening of the support frame.

3. The camera module of claim 2, wherein the ring shape includes a polygonal ring shape or a round ring shape.

4. The camera module of claim 1, wherein the lens is coupled to the lens coupler with a bump.

5. The camera module of claim 1, wherein each lens driver is a piezoelectric capacitor formed by stacking a bottom electrode, a piezoelectric membrane, and an upper electrode on each connector.

6. The camera module of claim 1, wherein the support frame, each connector, the lens coupler, and each lens driver are made with a Micro Electric Mechanical System (MEMS).

7. The camera module of claim 1, wherein the lens coupler takes a shape of a round ring.

8. The camera module of claim 1, wherein the plurality of lens drivers includes a first lens driver and a second lens driver opposing the first lens driver, and wherein the first lens driver is applied with a first voltage and the second lens driver is applied with a second voltage having an opposite polarity from that of the first voltage.

9. The camera module of claim 8, wherein the first voltage is a positive voltage and the second voltage is a negative voltage.

10. The camera module of claim 1, wherein each connector is formed with a through hole at a central region of each connector.

11. The camera module of claim 10, wherein each connector is divided by the through hole and formed with each lens driver.

12. A camera module comprising:
a lens barrel including at least one lens;
a Printed Circuit Board (PCB) positioned at a bottom surface of the lens barrel and mounted with an image sensor converting an optical image to an electrical signal;
a support frame having a plurality of sides;
a plurality of connectors positioned at an upper surface of the lens barrel and each connector of the plurality of connectors extended from a mid-portion of a respective side of the support frame;
a lens coupler connected to one end of each connector at a periphery of the lens coupler, formed with a window at an inner surface of the lens coupler for allowing light to pass, and coupled to at least one lens, and
a plurality of lens drivers wherein each lens driver of the plurality of lens drivers is formed at each of the connectors, respectively, to ascend or descend the connectors and the lens coupler;
wherein each lens driver is coupled at an upper side of the respective connector facing the connector; and
wherein each connector is interposed between the support frame and the lens coupler, symmetrically positioned with respect to the lens coupler.

13. The camera module of claim 12, further comprising a holder for supporting the lens barrel and an actuator, wherein the holder is coupled to the PCB.

14. The camera module of claim 13, wherein the actuator is configured to move the lens barrel.

15. The camera module of claim 14, wherein the actuator includes a handshake compensation mode.

16. The camera module of claim 12, wherein each lens driver is capable of moving the lens to an utmost upper surface, each lens driver is capable of moving the lens to an utmost bottom surface, and each lens driver is capable of moving an intermediate lens.

17. The camera module of claim 12, wherein the support frame takes a shape of a ring formed with an opening at an inner surface of the support frame, and wherein each connector and the lens coupler are positioned at the opening of the support frame.

18. The camera module of claim 12, wherein the lens is coupled to the lens coupler with a bump.

19. The camera module of claim 12, wherein the lens coupler takes a shape of a round ring.

* * * * *